(12) United States Patent
McKinnon

(10) Patent No.: US 9,177,381 B2
(45) Date of Patent: Nov. 3, 2015

(54) DEPTH ESTIMATE DETERMINATION, SYSTEMS AND METHODS

(75) Inventor: David McKinnon, Los Angeles, CA (US)

(73) Assignee: Nani Holdings IP, LLC, Culver City, CA (US)

( * ) Notice: Subject to any disclaimer, the term of this patent is extended or adjusted under 35 U.S.C. 154(b) by 311 days.

(21) Appl. No.: 13/330,883

(22) Filed: Dec. 20, 2011

(65) Prior Publication Data

US 2012/0163672 A1    Jun. 28, 2012

Related U.S. Application Data

(60) Provisional application No. 61/426,250, filed on Dec. 22, 2010.

(51) Int. Cl.
G06K 9/00    (2006.01)
G06T 7/00    (2006.01)

(52) U.S. Cl.
CPC ..... G06T 7/0075 (2013.01); G06T 2207/20016 (2013.01)

(58) Field of Classification Search
USPC .................................. 382/106, 154
See application file for complete search history.

(56) References Cited

U.S. PATENT DOCUMENTS

| 5,768,404 | A * | 6/1998 | Morimura et al. | 382/107 |
|---|---|---|---|---|
| 6,111,979 | A * | 8/2000 | Katto | 382/154 |
| 6,215,496 | B1 * | 4/2001 | Szeliski et al. | 345/419 |
| 6,215,899 | B1 * | 4/2001 | Morimura et al. | 382/154 |
| 6,320,978 | B1 * | 11/2001 | Szeliski et al. | 382/154 |
| 6,417,850 | B1 * | 7/2002 | Kang | 345/422 |
| 6,487,304 | B1 * | 11/2002 | Szeliski | 382/107 |
| 6,556,704 | B1 * | 4/2003 | Chen | 382/154 |
| 6,615,139 | B1 | 9/2003 | Chakravarthi | |
| 6,711,293 | B1 | 3/2004 | Lowe | |
| 6,836,572 | B2 * | 12/2004 | Ishiga et al. | 382/300 |
| 6,965,379 | B2 * | 11/2005 | Lee et al. | 345/427 |
| 7,015,926 | B2 | 3/2006 | Zitnick, III et al. | |
| 7,016,532 | B2 | 3/2006 | Boncyk et al. | |
| 7,110,453 | B1 | 9/2006 | Wilinski et al. | |

(Continued)

FOREIGN PATENT DOCUMENTS

| FR | 2923637 | 11/2007 |
|---|---|---|
| WO | 99/40726 | 8/1999 |

(Continued)

OTHER PUBLICATIONS

Tang, P. et al., "A Comparative Analysis of Depth-Discontinuity and Mixed-Pixel Detection Algorithms", 2007.

(Continued)

Primary Examiner — Chan Park
Assistant Examiner — Iman K Kholdebarin
(74) Attorney, Agent, or Firm — Stetina Brunda Garred & Brucker

(57) ABSTRACT

Systems and methods for generating pixel based depth estimates are disclosed. An image processing system operating as depth analysis engine generates an estimated depth associated with a pixel based on a reference image and other related images. A current depth estimate is refined based on neighboring pixels and calculated consistency scores. Further, depth estimates can be levered in object or scene recognition to trigger or initiate an action taken by a computing device.

31 Claims, 9 Drawing Sheets

(56) References Cited

U.S. PATENT DOCUMENTS

| | | | |
|---|---|---|---|
| 7,113,634 B2* | 9/2006 | Yano | 382/154 |
| 7,181,617 B2 | 2/2007 | Wise et al. | |
| 7,286,689 B2 | 10/2007 | Damera-Venkata et al. | |
| 7,403,652 B2 | 7/2008 | Boncyk et al. | |
| 7,477,780 B2 | 1/2009 | Boncyk et al. | |
| 7,564,469 B2 | 7/2009 | Cohen | |
| 7,565,008 B2 | 7/2009 | Boncyk et al. | |
| 7,580,156 B2 | 8/2009 | Kakutani | |
| 7,680,324 B2 | 3/2010 | Boncyk et al. | |
| 7,685,417 B2 | 3/2010 | Wise et al. | |
| 7,688,368 B2 | 3/2010 | Kijima et al. | |
| 7,775,437 B2 | 8/2010 | Cohen | |
| 7,881,529 B2 | 2/2011 | Boncyk et al. | |
| 7,899,243 B2 | 3/2011 | Boncyk et al. | |
| 7,899,252 B2 | 3/2011 | Boncyk et al. | |
| 7,949,160 B2* | 5/2011 | Hashimoto et al. | 382/128 |
| 8,027,582 B2 | 9/2011 | Li | |
| 8,142,023 B2* | 3/2012 | Lim | 353/28 |
| 8,249,334 B2* | 8/2012 | Berliner et al. | 382/154 |
| 8,559,761 B2* | 10/2013 | Nam et al. | 382/300 |
| 8,797,428 B2* | 8/2014 | Ishiga | 348/246 |
| 2002/0061131 A1* | 5/2002 | Sawhney et al. | 382/154 |
| 2003/0198377 A1* | 10/2003 | Ng | 382/154 |
| 2003/0198378 A1* | 10/2003 | Ng | 382/154 |
| 2004/0109585 A1* | 6/2004 | Tao et al. | 382/106 |
| 2004/0247159 A1 | 12/2004 | Damera-Venkata et al. | |
| 2005/0094900 A1 | 5/2005 | Abe | |
| 2005/0129305 A1* | 6/2005 | Chen et al. | 382/154 |
| 2005/0285874 A1 | 12/2005 | Zitnick, III et al. | |
| 2005/0286758 A1* | 12/2005 | Zitnick et al. | 382/154 |
| 2006/0285165 A1 | 12/2006 | Kakutani | |
| 2007/0237420 A1* | 10/2007 | Steedly et al. | 382/284 |
| 2007/0279494 A1* | 12/2007 | Aman et al. | 348/169 |
| 2008/0019470 A1* | 1/2008 | Nam et al. | 375/355 |
| 2008/0309662 A1* | 12/2008 | Hassner et al. | 345/419 |
| 2009/0274804 A1* | 11/2009 | Wilson et al. | 426/231 |
| 2009/0315981 A1* | 12/2009 | Jung et al. | 348/43 |
| 2009/0324016 A1 | 12/2009 | Ikeda et al. | |
| 2010/0111444 A1 | 5/2010 | Coffman | |
| 2010/0182410 A1* | 7/2010 | Verburgh et al. | 348/51 |
| 2010/0315412 A1* | 12/2010 | Sinha et al. | 345/419 |
| 2011/0128394 A1* | 6/2011 | Narayanan et al. | 348/222.1 |
| 2011/0211044 A1* | 9/2011 | Shpunt et al. | 348/46 |
| 2011/0234842 A1* | 9/2011 | Ishiga | 348/223.1 |
| 2011/0261050 A1* | 10/2011 | Smolic et al. | 345/419 |
| 2011/0285910 A1 | 11/2011 | Bamji et al. | |
| 2011/0311128 A1* | 12/2011 | Wilkinson et al. | 382/154 |
| 2012/0141016 A1* | 6/2012 | Wildeboer et al. | 382/154 |
| 2012/0162412 A1* | 6/2012 | Kim et al. | 348/135 |
| 2012/0173184 A1* | 7/2012 | Ovsiannikov et al. | 702/97 |
| 2012/0188389 A1* | 7/2012 | Lin et al. | 348/218.1 |
| 2013/0011046 A1* | 1/2013 | Choi et al. | 382/154 |
| 2013/0106848 A1* | 5/2013 | Nguyen et al. | 345/419 |
| 2013/0182945 A1* | 7/2013 | Kim et al. | 382/154 |
| 2014/0333739 A1* | 11/2014 | Yang et al. | 348/54 |

FOREIGN PATENT DOCUMENTS

| | | |
|---|---|---|
| WO | 00/77734 | 12/2000 |
| WO | 2009/023044 | 2/2009 |

OTHER PUBLICATIONS

Cherian, A. et al., "Accurate 3D Ground Plane Estimation from a Single Image", Department of Computer Science and Engineering, University of Minnesota, Minneapolis, 2009.

Shotton, J. et al., "Real-Time Human Pose Recognition in Parts from Single Depth Images", Microsoft Research Cambridge & Xbox Incubation.

Liu, B. et al., "CS 229 Final Project: Single Image Depth Estimation From Predicted Semantic Labels", 2009.

* cited by examiner

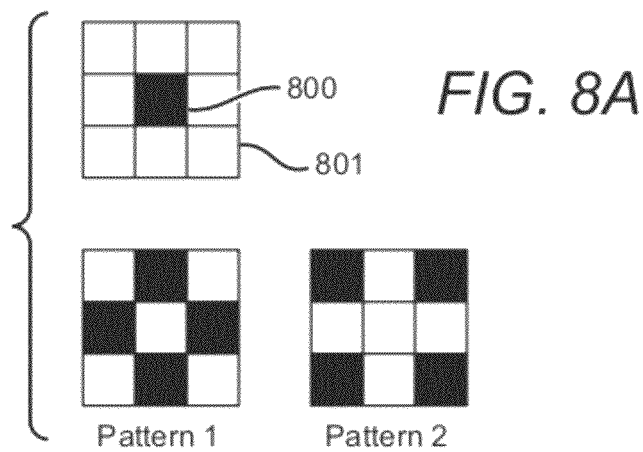
FIG. 8A
Pattern 1    Pattern 2
FIG. 8C
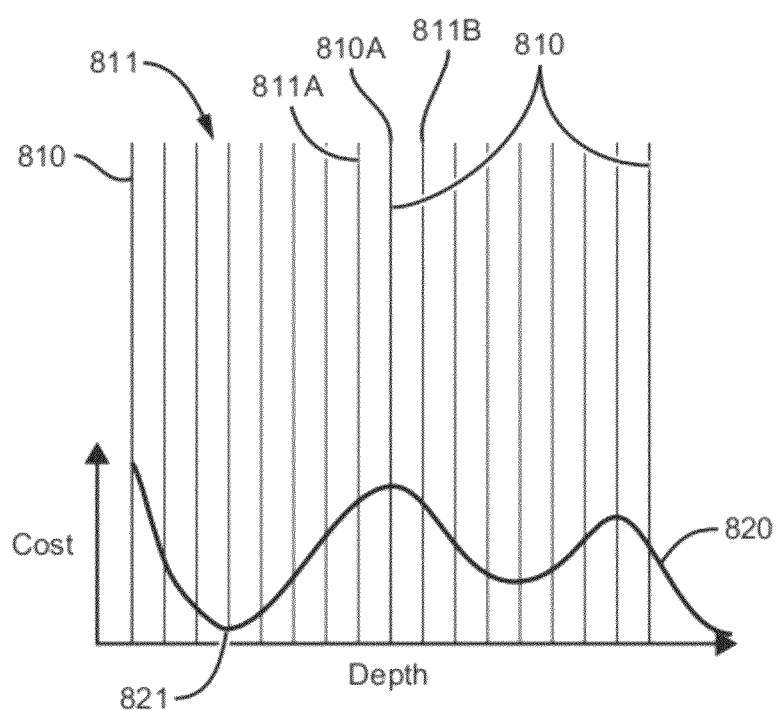

DEPTH ESTIMATE DETERMINATION, SYSTEMS AND METHODS

This application claims the benefit of priority to U.S. provisional application 61/426,250 filed on Dec. 21, 2010. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is image processing and associated technologies.

BACKGROUND

Reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavor to which this specification relates.

It is known to perform three-dimensional (3D) scene modeling by generating depth fields of a scene using parallax data derived from two or more images. In such processes, images taken of a scene from two or more imaging locations can be used to derive a stereo depth-map. The depth-map associates with every pixel in an image an indication of how far away the pixel's observed location is in the scene. Such depth maps can be used to determine the 3D shape of the scene.

Methods for deriving depth maps using parallax methods have typically been classed in two categories. The first category is commonly referred to as a "local method", which calculates the depth for each pixel of the base image individually, not taking into account depth allocated to surrounding pixels. Local methods are fast and memory efficient but prone to incorrectly allocating depths to a given pixel.

The second category is commonly referred to as a "global method". This method attempts to relate the choice of depth for a given pixel of the base image with the depth choices for immediately surrounding pixels. This way some consideration of the local continuity of a surface is taken into consideration when determining each and every depth and consequently the algorithm has a global perspective. Global methods are known to provide superior estimates of depth but at the expense of being many times slower and more memory intensive to compute than local methods.

Thus, there is still a need for depth estimation analyses.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

SUMMARY OF THE INVENTION

In a first broad form the present invention seeks to provide a method for determining a depth estimate for at least one pixel in a reference image, the reference image being one of a plurality of images of a three dimensional scene, the method including:

a) providing access to a depth analysis engine comprising a device interface;
b) obtaining, by the depth analysis engine, a plurality of images including a reference image representative of a scene via the device interface;
c) determining, by the depth analysis engine, current depth estimates for current pixels in a current resolution of the reference image; and
d) deriving, by the depth analysis engine, a refined depth estimate by refining the current depth estimate for at least one current pixel via:
  i) determining a plurality of candidate depths at least in part using the current depth estimates of the current pixel and at least one neighboring current pixel;
  ii) determining consistency scores for at least some of the candidate depths, the consistency score being indicative of the similarity of the current pixel with at least one candidate pixel in other ones of the plurality of images;
  iii) updating the current depth estimate of the current pixel using the consistency scores; and
e) configuring a device to initiate an action as a function of the refined current depth estimate.

Typically the method includes, refining the current depth estimate by:
  a) selecting a candidate depth having an optimum consistency score; and
  b) refining the current depth estimate using the selected candidate depth.

Typically the method includes, refining the current depth estimate by replacing the current depth estimate with:
  a) the selected candidate depth; and
  b) a depth interpolated from the selected candidate depth and two or more neighboring candidate depths using the respective consistency scores.

Typically the method includes, determining the plurality of candidate depths by:
  a) comparing the current pixel to a plurality of neighboring current pixels;
  b) selecting at least one neighboring current pixel referenced on a similarity to the current pixel; and
  c) determining the candidate depths to include the current depth estimates of the current pixel and at least one selected neighboring current pixel.

Typically the method includes, determining the plurality of candidate depths to include the current depth estimates and adjacent depth estimates of the neighboring pixels and not that of the current pixel.

Typically the previous and current depth estimates are assigned to previous and current depth planes respectively, the number of current depth planes being greater than the number of previous depth planes.

Typically the candidate depths are at least one of:
  a) a plurality of discrete depths; and
  b) a depth range.

Typically the method includes iteratively refining the current depth estimates of current pixels in the current resolution of the reference image.

Typically the method includes iteratively refining the current depth estimates by:
  a) refining the current depth estimate of a plurality of current pixels; and
  b) further refining the current depth estimate of at least one of the plurality of current pixels.

Typically the method includes, determining the current depth estimates using previous depth estimates for equivalent previous pixels in a previous resolution of the reference image, the previous resolution being the same or lower than the current resolution Typically the method includes determining current depth estimates for current pixels by successively increasing current resolutions of the reference image using previous depth estimates of equivalent previous pixels from a previous lower resolution of the reference image.

Typically the method includes, refining the current depth estimates for current resolutions of the image using a parallax local method, wherein the local method is performed for limited candidate depths determined from previous depth estimates of equivalent previous pixels from a previous lower resolution of the reference image.

Typically a current pixel is equivalent to a previous pixel if the current and previous pixels are at the same location in the reference image.

Typically the method includes, determining first depth estimates for first pixels in a first resolution of the reference image using a parallax method, the first resolution being a lowest resolution.

Typically the method includes, determining the first depth estimates using a global parallax method.

Typically the method includes:
a) in an depth analysis device, determining current depth estimates for current pixels in a current resolution of the reference image; and
b) in the depth analysis device, refining the current depth estimate for at least one current pixel by:
  i) selecting a plurality of candidate depths at least in part using the current depth estimates of the current pixel and at least one neighboring current pixel;
  ii) calculating consistency scores for at least some of the candidate depths, the consistency score being indicative of the similarity of the current pixel with at least one candidate pixel in other ones of the plurality of images; and
  iii) updating the current depth estimate of the current pixel using the consistency scores.

Typically the method includes, storing in a store, at least one of:
a) image data; and
b) depth estimate data.

Typically the method includes updating a current depth estimate by updating depth estimate data stored in a store.

In a second broad form the present invention seeks to provide a method for determining a depth estimate for at least one pixel in a reference image, the reference image being one of a plurality of images of a three dimensional scene, the method including:
a) in an electronic processing device, determining current depth estimates for current pixels in a current resolution of the reference image; and
b) in the electronic processing device, refining the current depth estimate for at least one current pixel by:
  i) selecting a plurality of candidate depths at least in part using the current depth estimates of the current pixel and at least one neighboring current pixel;
  ii) calculating consistency scores for at least some of the candidate depths, the consistency score being indicative of the similarity of the current pixel with at least one candidate pixel in other ones of the plurality of images; and
  iii) updating the current depth estimate of the current pixel using the consistency scores.

In a third broad form the present invention seeks to provide a depth analysis system for determining a depth estimate for at least one pixel in a reference image, the reference image being one of a plurality of images of a three dimensional scene, the system including:
a device interface configured to communicatively couple to a device and receive image data from the device;
an image database coupled with the device interact and storing the image data, the image data representative a scene and comprising a plurality of images, including a reference image; and
a depth analysis engine coupled with the image database and configured to:
  a) determine current depth estimates for current pixels in a current resolution of the reference image; and
  b) refine the current depth estimate for at least one current pixel by:
    i) selecting a plurality of candidate depths at least in part using the current depth estimates and adjacent depth estimates of the neighboring pixels and not that of the current pixel;
    ii) calculating consistency scores for at least some of the candidate depths, the consistency score being indicative of the similarity of the current pixel with at least one candidate pixel in other ones of the plurality of images;
    iii) updating the current depth estimate of the current pixel using the consistency scores; and
  c) configure the device to initiate an action based on the updated current depth estimate.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 8A is a schematic diagram of example pixel patterns.

FIG. 8C is a schematic diagram showing an example of a consistency score for different depth planes.

DETAILED DESCRIPTION

It should be noted that while the following description is drawn to a computer/server based processing systems, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within a networking context, "coupled with" is also considered to mean "communicatively coupled with" where two networked elements are able to exchange data over a network.

One should appreciate that the disclosed techniques provide many advantageous technical effects including generating one or more signals as a function of depth estimates for pixels in an image. The signals (e.g., electronic, wireless, wired, etc.) can be transmitted to computing devices where the signals enable the computing device to initiate or take action according to the signals.

Figure 1A:
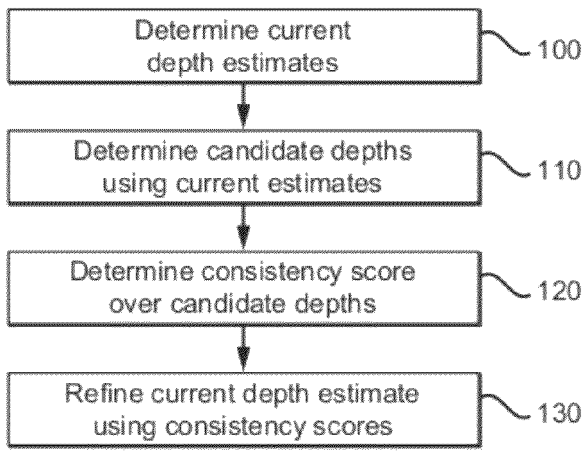
FIG. 1A is a flowchart of an example of a process for determining a depth estimate for a pixel in a reference image.

An example process for determining a depth estimate for a pixel in a reference image will now be described with reference to FIG. 1A.

For the purpose of this example, it is assumed that a 3D scene has been imaged using a plurality of images taken from different views, and that any one of these images is selected as the reference image. The plurality of images may include two or more images and, in addition to imaging a static 3D scene as an alternative, this process can be performed on multiple images taken of a moving scene. The term scene should be taken to encompass any imaged object, scene, or the like, and is not intended to be limiting.

At step 100, current depth estimates for a current resolution of the reference image are obtained. This may be achieved in any one of a number of ways, and can include for example estimate pixel depths using known techniques.

In one particular example, this is performed on the reference image using at least two different resolutions, with the current depth estimates being based on previous depth estimates obtained for a previous resolution of the reference image, with the current resolution being higher than the previous resolution. Thus, the previous depth estimates obtained from a lower resolution of the image are effectively propagated to equivalent current pixels at the current resolution of the reference image, the equivalent pixels being at the same location in the two resolutions of the reference image.

The previous depth estimates can be obtained in any suitable manner, and can be as a result of performing the current method at the previous lower resolution of the image. It will be appreciated however that typically seed depth estimates are required for a lowest image resolution, and these may be determined using techniques known in the art, such as a global method, as will be described in more detail below.

Once current depth estimates have been determined, the current depth estimate for at least one current pixel in the reference image can be refined using the process of steps 110 to 130.

In this regard, at step 110 a number of candidate depths are determined for the current pixel using the current depth estimates. In one example, the candidate depths are selected from the current depth estimate of the current pixel and at least one neighboring current pixel. In another example, additional candidate depths may be established, for example, based on depth planes adjacent to those containing the candidate depths, as will be described in more detail below. Additionally, the neighboring pixels whose depth estimates are selected as candidate depths can be controlled based on other parameters, such as pixel color and current depth estimate, thereby allowing the candidate depths to be further constrained.

At step 120 a consistency score is determined for at least some candidate depths. In one example, the candidate depths are a range, with a consistency score being determined over the entire range. More typically, however, the candidate depths are provided on discrete depth planes, with the consistency score being determined for each of the candidate depths.

Consistency scores can be determined in any suitable manner, and typically this involves comparing the current pixel in the reference image to candidate pixels in other ones of the plurality of images, to determine a pixel similarity, based on the current candidate depth. Thus, the process will involve, for the current candidate depth, identifying candidate pixels in other ones of the image and then performing similarity comparisons to determine the similarity of the current pixel with each of the candidate pixels in the other images. By repeating this for each candidate depth, this allows a consistency score for each depth (or across the range of depths) to be established.

At step 130 the current depth estimate for the current pixel is revised using the consistency scores. This may be performed by selecting a best candidate depth, for example based on the candidate depth having an optimum consistency score (lowest or highest score depending on how the consistency score is calculated).

Steps 110 to 130 are typically repeated for some or all of the pixels in the reference image, so that the current depth estimates can be refined for some or all of the current pixels.

The above described process may be performed iteratively. For example, once current depth estimates for pixels in the reference image have been refined, the refining process can be repeated at least one further time for the current resolution, to thereby further refine the candidate depth estimates.

Additionally, the process can be repeated for successively increasing resolutions of the reference image, allowing coarse depth estimates to be obtained for a low resolution image rapidly, with increasingly finer depth estimates being determined at increasing resolutions.

In one particular example, depth estimates for the lowest resolution image, typically referred to as the first image, are determined using a global method. The global method identifies the location of a pixel by comparing the pixel in the reference images to pixels in other ones of the plurality of images, as well as by examining the depth of surrounding pixels. The use of a global method is employed, which results in a reasonably accurate depth estimate. Whilst the global method is computationally quite expensive, as this is only performed at a low resolution image, it can be performed relatively quickly and without undue computation.

The depth estimates obtained for the first low resolution image are then used as current depth estimates in the current higher resolution of the reference image. The depth estimate of the current pixels is refined using a local method, which calculates the depth for each pixel of the reference image individually by comparison to pixels in other ones of the plurality of images, without taking into account depth allocated to surrounding pixels. However, the process is limited to candidate depths selected based on the current depth estimates, allowing the local method to be performed taking into account the depth of neighboring pixels.

By limiting the refinement to candidate depths, this constrains the amount of calculation required to determine the consistency scores, which in turn reduces the computational requirements associated with the local method that would arise when performing the process at high resolutions. Additionally, constraining the depth used in performing the local method helps avoid spurious results, in which pixels are assigned a depth significantly different to that of similar neighboring pixels.

Figure 1B:
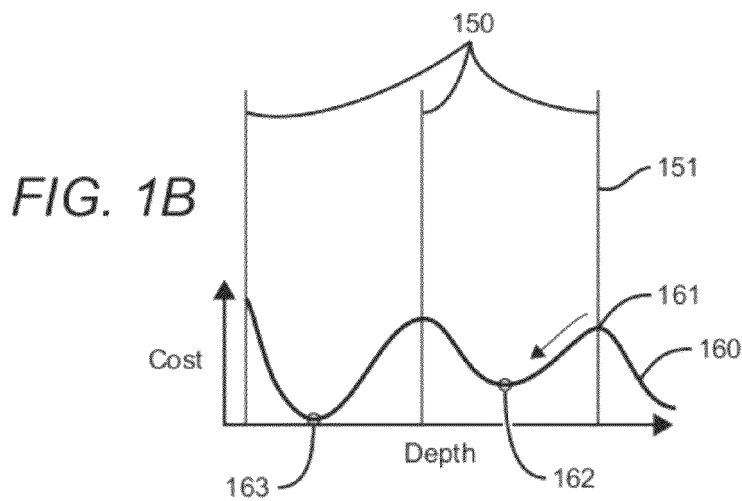
FIG. 1B is a schematic diagram showing an example of a local minima in a pixel consistency score.

The process can also provide improved results in correctly identifying global minima in the consistency score, as will now be described with reference to FIG. 1B.

In this example, a photo-consistency cost function 160 is evaluated for one particular pixel in a reference image at a number of discrete depth planes 150. Firstly, if the current pixel is currently estimated to be on depth plane 151, then process can iteratively descend to the nearby local minima (ref) via a series of subsequent evaluations of the photo-consistency cost at increasingly finer depth increments, as the image resolution is increased.

In the provided example this would not result in the global minima of the photo-consistency cost being determined. Thus, for example, a local plane-sweeping method will return—as the best depth estimate for the pixel—the discrete depth 162, with the lowest photo-consistency cost. However as is illustrated in the figure the true global minimum of this cost function actually lies at 163. This behavior occurs when neighboring discrete depth labels in the initial state are within a convex region of the true global minima, which can occur when local plane-sweeping parallax methods are used to initialize the depth estimates for the pixels.

However, by allowing the depth of neighboring pixels to be taken into account when determining candidate depths, this allows the process to jump from the local minima and descend towards the global minima, thereby increasing the accuracy of the depth determination process.

Accordingly, the above described process is designed to increase the accuracy/resolution of a given depth map or set of 3D seed points using a multi-view stereo approach. The process utilizes the fact that global methods are very proficient at determining a solution to the depth associated with a set of images, however the high computational and memory requirements mean that it is computationally onerous to determine a solution that has a high resolution in the z-direction.

Accordingly, the process uses an initial solution determined from a global method, which typically is in a convex domain about the global minimum of the photo-consistency score for each pixels depth value. The process then iteratively moves the depth towards the minima of the photo-consistency score, in turn refining the depth, whilst performing only local calculations to achieve this. Local smoothness is implicitly enforced by limiting depth movements to be within a domain of the current depth estimates of the current and neighboring pixels.

In one example, the refinement is achieved by employing the assumptions that neighboring points on an object's surface usually share either (Or both) the same approximate color or distance from the imaging device, and can therefore be used for determining candidate depths over which a local method can be performed, thereby reducing the likelihood of the calculation being constrained to a local as opposed to a global minima. Furthermore the refinement can proceed in hierarchical fashion so as to further reduce the uncertainty, whilst limiting the computational demand.

Previous methods for depth-map generation relied upon just the spatial proximity of pixels in the images in determining the new depth-map estimates. Additionally, previous methods have only sought to swap the depths associated with surrounding pixels rather than refining the depth estimates themselves. This can lead to a number of problems.

For example, the previous methods don't account for the likelihood that a large change in the observed color or depth of surrounding pixels will often indicate an object boundary, in turn impeding reliable depth estimates. Additionally, previous methods create new depth estimates by swapping depth values with surrounding pixels as opposed to refining them specifically.

In contrast the above described method can account for these problems by considering how likely it is that two pixels share a similar depth according to the similarity of their colors and depth estimates. Refined estimates of the pixel's depth are obtained by searching a range of finer increments surrounding the current depth and estimating the best value. These assumptions are used to reduce the uncertainty and increase the speed of subsequent depth-map refinement estimates.

Figure 2:
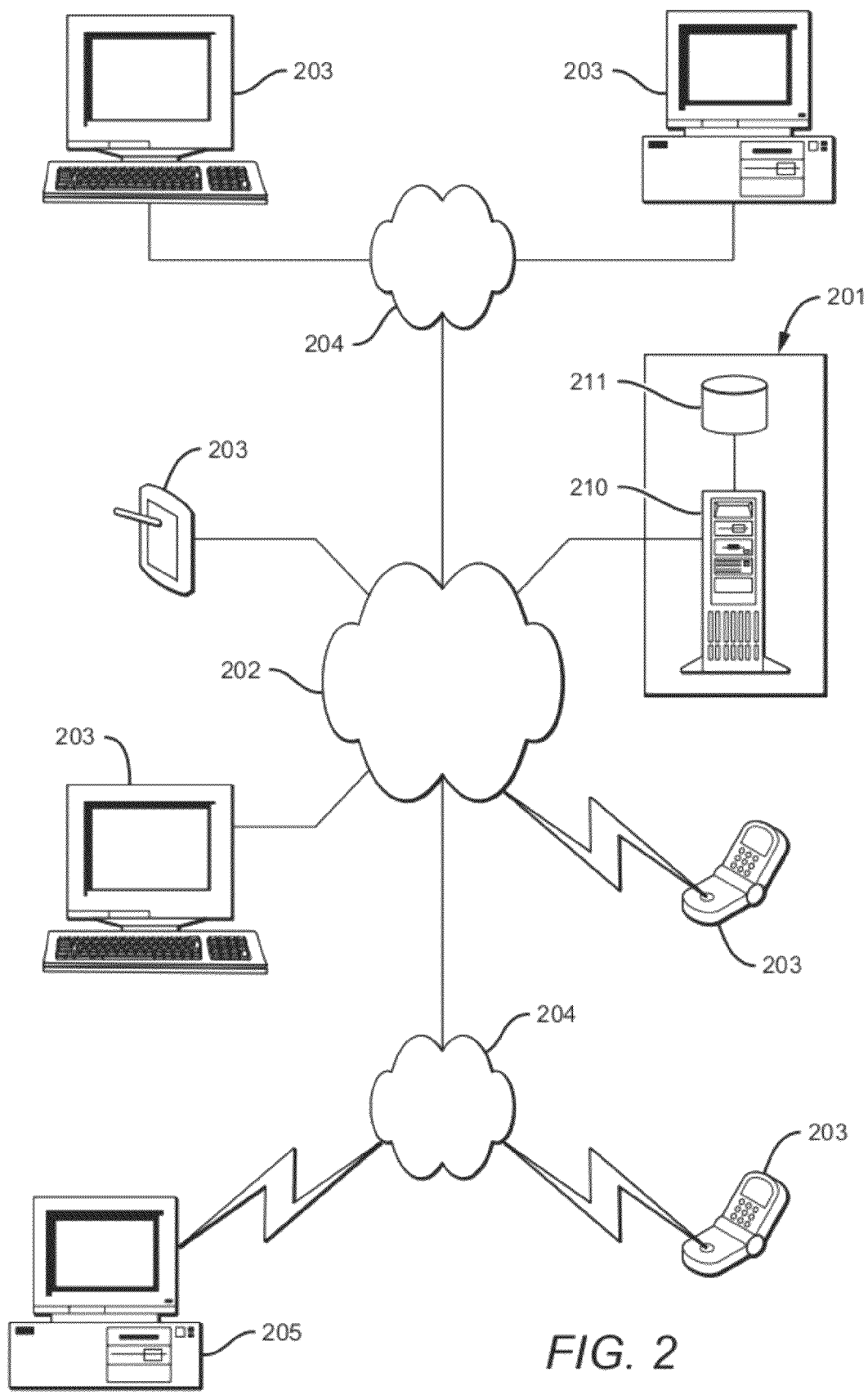
FIG. 2 is a schematic diagram of an example of a distributed computer architecture.

In one example, the process is performed at least in part using a processing system, such as a suitably programmed computer system. This can be performed on a stand alone computer, with a microprocessor executing applications software allowing the above described method to be performed. Alternatively, the process can be performed by one or more processing systems operating as part of a distributed architecture, an example of which will now be described with reference to FIG. 2.

In this example, a base station 201 is coupled via a communications network, such as the Internet 202, and/or a number of local area networks (LANs) 204, to a number of end stations 203 and optionally a number of imaging devices 205, such as cameras, or the like.

In one example, the base station 201, and in particular the processing system 210, executes a software application to thereby cause the processing system 210 to implement the pixel depth determination process. The software instructions may also be adapted to perform other steps in the process of analyzing 2D images to generate a 3D representation of a scene, as will be described in more detail below. In this example, the end stations 203 can be used by operators to control the pixel depth determination process, as well as to provide images from the imaging devices 205, to allow the process to be performed. This can be achieved in any suitable manner, such as by having the base station 201 host web pages to allow submission of images, to control parameters relating to the pixel depth determination process, and to receive resulting pixel depth estimations and/or 3D reconstructions, or depth maps. Each end station 203 is therefore typically adapted to communicate with the processing systems 210, for example using a browser application. However, this is not essential and any suitable arrangement may be used.

Figure 3:
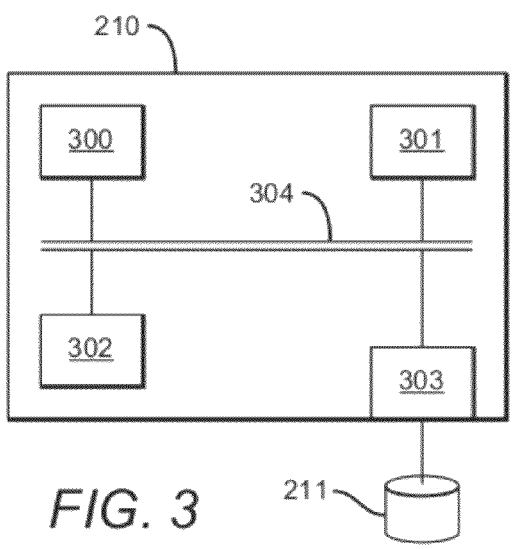
FIG. 3 is a schematic diagram of an example of a processing system.

An example of a suitable processing system 210 is shown in FIG. 3. In this example, the processing system 210 includes at least one microprocessor 300, a memory 301, an input/output device 302, such as a keyboard and/or display, and an external interface 303, interconnected via a bus 304 as shown. In this example the external interface 303 can be utilized for connecting the processing system 210 to peripheral devices, such as the communications networks 202, 204, databases 211, other storage devices, or the like. Although a single external interface 303 is shown, this is for the purpose of example only, and in practice multiple interfaces using various methods (e.g., Ethernet, serial, USB, wireless or the like) may be provided.

In use, the microprocessor 300 executes instructions in the form of applications software stored in the memory 301 to allow the pixel depth determination process to be performed. The applications software may include one or more software modules, and may be executed in a suitable execution environment, such as an operating system environment, or the like. Accordingly, it will be appreciated that the processing system 300 may be formed from any suitable processing system, such as a suitably programmed computer system, PC, web server, network server, custom hardware, or the like. Thus, it will be appreciated that the process can be performed using any electronic processing device such as a microprocessor, microchip processor, logic gate configuration, firmware optionally associated with implementing logic such as an FPGA (Field Programmable Gate Array), or any other electronic device, system or arrangement capable of processing pixel information and deriving a pixel depth estimate.

Figure 4:
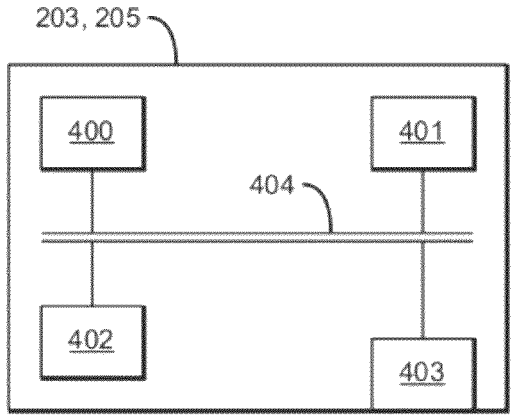
FIG. 4 is a schematic diagram of an example of an end station.

As shown in FIG. 4, in one example, the end station 203 includes at least one microprocessor 400, a memory 401, an input/output device 402, such as a keyboard and/or display, and an external interface 403, interconnected via a bus 404 as shown. In this example the external interface 403 can be utilized for connecting the end station 203 to peripheral devices, such as the communications networks 202, 204, databases 211, other storage devices, or the like. Although a single external interface 403 is shown, this is for the purpose of example only, and in practice multiple interfaces using various methods (e.g., Ethernet, serial, USB, wireless or the like) may be provided.

In use, the microprocessor 400 executes instructions in the form of applications software stored in the memory 401 to allow communication with the base station 201, for example to allow images to be provided to the processing system 210 for analysis. The microprocessor 400 may also be adapted to communicate with peripheral devices, such as the imaging devices 205, allowing images to be downloaded there from, as will be appreciated by persons skilled in the art. Accordingly, it will be appreciated that the end stations 203 may be formed from any suitable processing system, such as a suitably programmed PC, Internet terminal, lap-top, hand-held PC, mobile phone, smart phone, or other communications device, which is typically operating applications software. It will therefore be appreciated from the above that the end station 203 could include an imaging device 205, such as a camera, or the like.

Examples of the pixel depth determination process will now be described in further detail. For the purpose of these examples, it is assumed that the base station 201, and in particular one of the processing systems 210 executes applications software for performing the image analysis, with the images being supplied from a camera 205, using the end stations 203. However, this is not essential and it will be appreciated that the end stations 203 could additionally and/or alternatively be used for executing software for performing the pixel depth determination. A further alternative is for the process to be implemented within an imaging device, such as a camera, smart phone, or the like.

It will also be assumed that actions performed by the processing system 210 are performed by the microprocessor 300 in accordance with instructions stored as applications software in the memory 301 and/or input commands received from a user via the I/O device 302. Similarly, it will be assumed that actions performed by the end station 203 are performed by the microprocessor 400 in accordance with instructions stored as applications software in the memory 401 and/or input commands received from a user via the I/O device 402.

Figure 5:
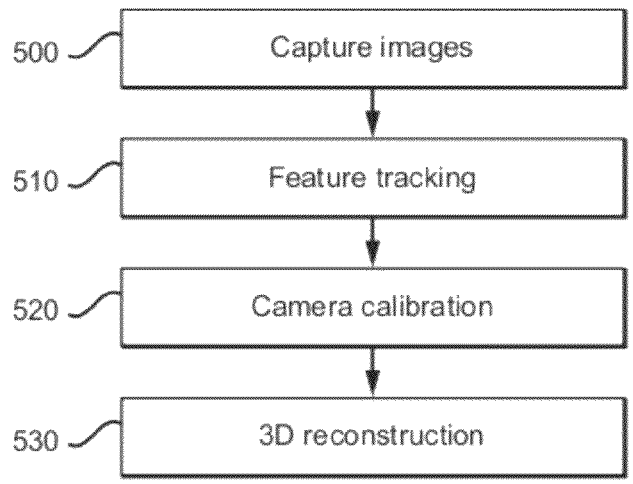
FIG. 5 is a flowchart of an example process for performing depth map construction from a plurality of images of a 3D scene.

An example of the overall process for reconstructing a 3D scene from 2D images will now be described with reference to FIG. 5.

In this example, at step 500 a plurality of images of a 3D scene are captured. This may be performed in any one of a number of ways, but typically would involve capturing images using an imaging device 205, such as a camera. The imaging is typically performed so that the views of the 3D scene are captured from a range of different angles. However, other techniques can be used, such as taking multiple images of a moving object, as will be appreciated by persons skilled in the art.

Image data indicative of the images is then transferred to the processing system 210 for analysis. This can be achieved in any suitable manner, depending on the nature of the end station 203 or imaging device 205. For example, if the imaging device is part of an end station 203, such as a smart phone, the image data can be transferred directly to the processing system 210, by the end station 203. Alternatively, image data may need to be downloaded from the imaging device 205, to the end station 203, and subsequently transferred, as will be appreciated by persons skilled in the art.

At step 510 feature tracking is performed to identify common features within the plurality of images, thereby allowing camera calibration information to be detected. In one example, this is performed by identifying corners of the images, which in turn allows information, such as scene viewing angles to be determined for each of the images. In one example, this can be performed using a Structure From Motion process, which results in a camera projection matrix being created for each image to be used for 3D reconstruction. This allows for rays to be cast from these camera locations and used in the determination of the scene structure. Such processes are known in the art, and will not therefore be described in any further detail.

Figure 6A:
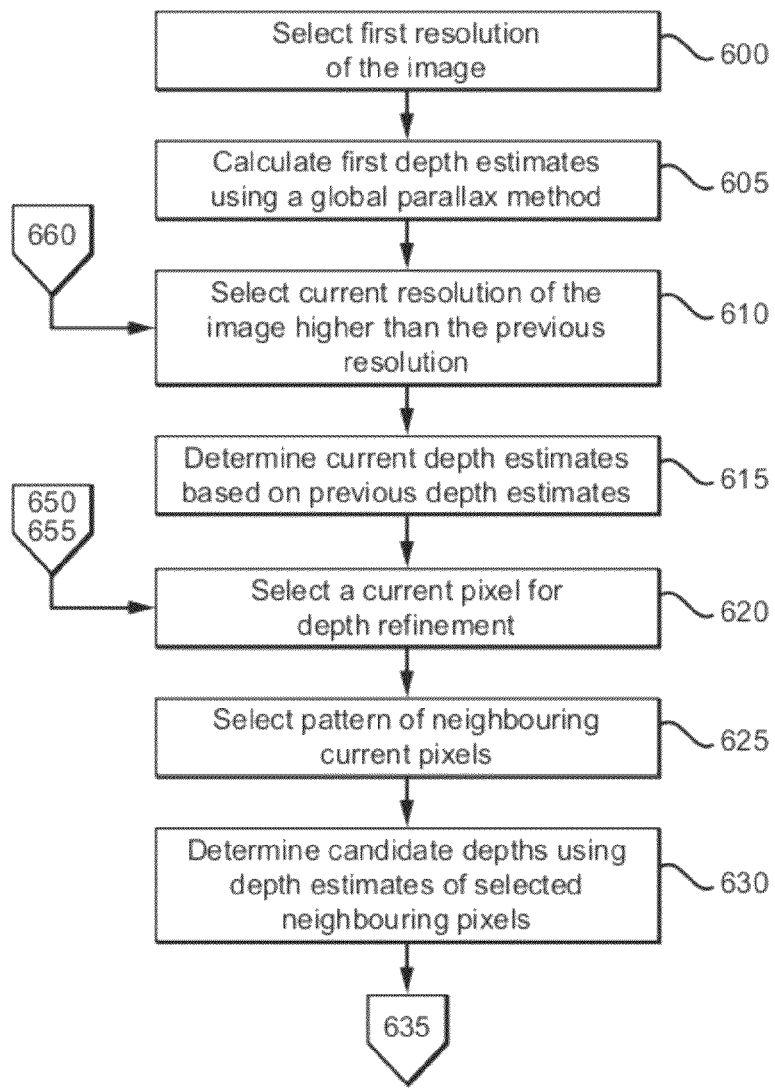
FIGS. 6A and 6B are a flowchart of a second example of a process for determining a depth estimate for pixels in a reference image.
Figure 6B:
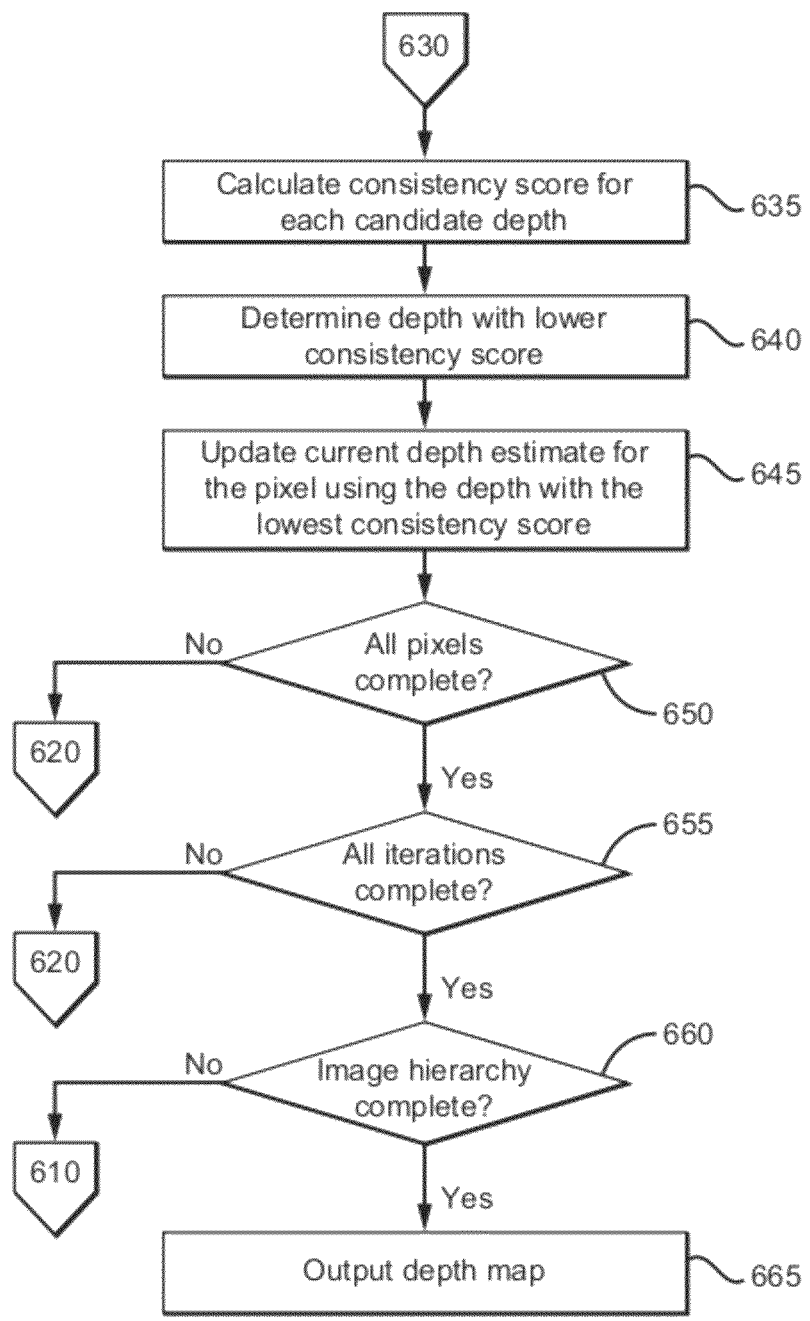

Once the camera calibration information has been determined, it is then possible for the processing system 210 to perform 3D reconstruction from the images at step 530. The 3D reconstruction involves determining the depth estimates for pixels in a reference one of a plurality of images, as described above with respect to FIG. 1. A second more detailed example of a method for determining a depth estimate for pixels will now also be described with reference to FIGS. 6A and 6B.

For the purpose of this example, it will be assumed that the method is performed by the processing system 210 and it will therefore be appreciated that the methodology is largely performed by the microprocessor 300. Alternatively however, the process could be performed on a stand-alone computer system and the processing steps could therefore be performed by the microprocessor 400. Reference to the microprocessor 300 will therefore be understood to include the option of allowing some or all of the steps to be performed by the microprocessor 400 and this will not therefore be described in any further detail.

At step 600, a first resolution of image is selected by the microprocessor 300. The first resolution may be selected in any one of a number of ways, but typically involves retrieving a first low resolution version of the reference image from image data stored in a store, such as the memory 301. In the event that a low resolution version of the image is not available, it will be appreciated that the microprocessor 300 can alternatively retrieve a higher resolution version of the reference image, and then generate a low resolution version using appropriate computation techniques, as will be appreciated by persons skilled in the art.

At step 605 the microprocessor 300 calculates a first depth estimate for each of the first pixels in the first resolution of the reference image using a parallax global method. Global methods are known in the art and these will not therefore be described in any detail. However, as outlined above, the process typically involves using the camera calibration information to determine where a pixel in the reference image is likely to appear in the other ones of the plurality of images, which have been taken from a different viewpoint to the reference image. The microprocessor 300 uses this information to determine candidate pixels in the other images, which are then compared to the current pixel to determine the candidate pixel that appears to be the closest match. Once the closest match has been identified, this can be used to allow a depth to be determined. The process will also typically take into account the depths of surrounding pixels, as will be appreciated by persons skilled in the art. The first depth estimate determined for each first pixel is then typically stored in a store, such as the memory 301, or the database 211. In one example, this is achieved by storing depth estimate data associated with an indication of the location of the respective pixel, although any suitable technique may be used.

Figure 7A:
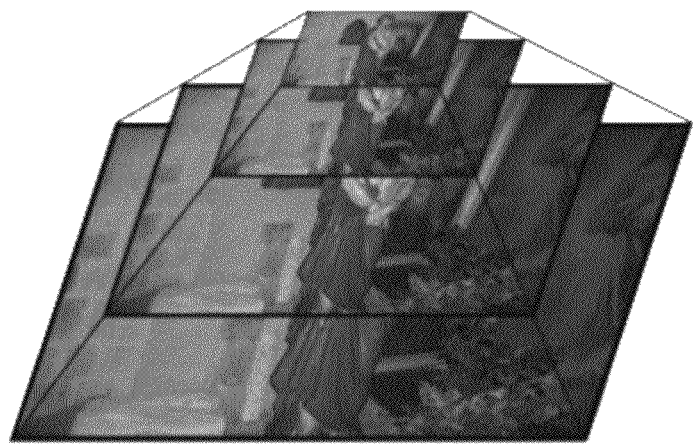
FIGS. 7A and 7B are schematic representations of an example of an image pyramid and the propagation of depth maps through the image pyramid, respectively.

At step 610 the microprocessor 300 determines a current resolution of the image, with the current resolution being higher than a previous resolution. It will be appreciated that for a second resolution, the previous resolution is the first resolution, and that for subsequent resolutions, the previous resolution will be the next lower resolution in a series of increasing image resolutions. The sequence of increasing resolutions can be represented as an image pyramid, as shown in FIG. 7A.

At step 615 the microprocessor 300 determines current depth estimates based on the previous depth estimates. Thus, for a second resolution, the microprocessor 300 will determine current depth estimates of the pixels based on the first depth estimates determined at step 605. This is performed by selecting the current depth estimate of a current pixel to be the same as a previous depth estimate for an equivalent previous pixel, the equivalent previous pixel being at the same location in the reference image. Thus, the microprocessor 300 retrieves the depth estimate data for the previous resolution of the reference image, from the memory 301, and uses this to generate current depth estimate data for the current pixels in the current resolution of the reference image, with this being stored in the memory 301, or database 211.

At step 620 the microprocessor 300 selects a current pixel for depth refinement. In particular, the depth refinement process is used to refine the current depth estimate for the current pixel using a parallax local method. As previously described, the local method is constrained over limited candidate depths to therefore reduce the computation required, and reduce the likelihood of spurious results.

Typically the candidate depths are determined based on the depth of the current pixel, as well as the depth of surrounding pixels. Accordingly, at step 625 the microprocessor 300 selects a pattern of neighboring current pixels, such as one of the two example patterns shown in FIG. 8A. In these examples, for a current pixel 800, having surrounding pixels shown generally at 801, the neighboring current pixels can be selected according to either pattern 1 or pattern 2. As will be appreciated by persons skilled in the art, other patterns could be used, and the example patterns are not intended to be limiting. It should also be noted that different patterns may be used in different iterations as will be described in more detail below.

Figure 8B:
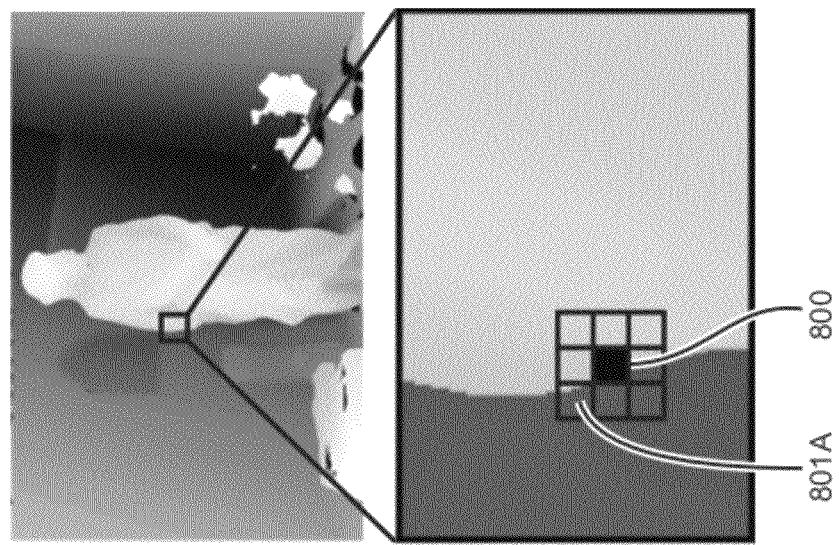
FIG. 8B is a schematic diagram of an image and corresponding depth map showing the selection of neighboring pixels for determining candidate depths.
Figure 8B:
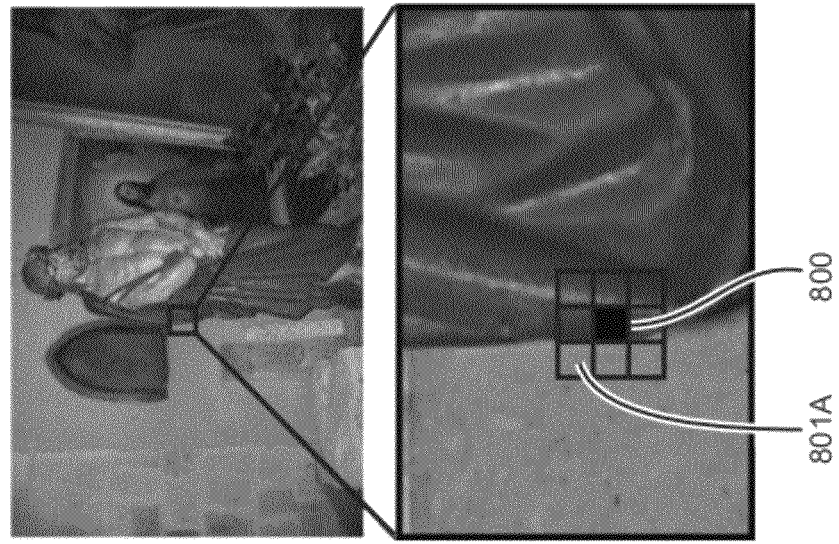

In one example, this process includes having the microprocessor 300 compare the current pixel to the neighboring pixels to determine a pixel similarity, for example based on pixel properties, such as color, or the like. In this example, the microprocessor 300 retrieves pixel information for the current and neighboring pixels from image data stored in the memory 301 or database 211, and compares the pixel information to determine if the current pixel and neighboring pixel differ by more than a predetermined amount, typically defined by a threshold value stored in the memory 301. In the event that the pixels differ by more than the threshold amount, then the neighboring pixel can be excluded from the process for determining candidate depths. An example of this is shown in FIG. 8B. In this example, it can be seen that the pixel 801A is significantly different in color to the current pixel 800, and it is therefore unlikely that this is located at the same depth. Accordingly, the pixel 801A is not used in determining the candidate depths on the basis that it is unlikely that the pixel 800 is located at the same depth.

At step 630 the candidate depths are determined using depth estimates of the selected neighboring pixels. Thus, the microprocessor 300 retrieves the corresponding current depth estimates of the current pixel and the selected neighboring pixels from the memory 301, and uses these to determine the candidate depths. Whilst the candidate depths can be determined in any one of a number of ways, typically this involves examining the current depth estimates of the current and selected neighboring pixels, removing any duplicate depths, and then defining the candidate depths using the remaining depth estimates.

In one example, the depth estimates are constrained to defined depth planes. In particular, a number of depth planes are defined for each resolution of the image, with lower resolution images having a smaller number of depth planes than higher resolution images. Accordingly, when a depth estimate is determined, this will be assigned to one of the depth planes associated with the current resolution of the image. It will be appreciated from this that the current depth estimates, and hence the candidate depths, form discrete depth values corresponding to the depth planes.

In this example, the candidate depths are selected to be equal to the current depth estimates of both the current pixel and the neighboring pixels. However, in another example, additional candidate depths may be defined based on the depth of depth planes adjacent to those of the selected candidate depths. An example of this will now be described with reference to FIG. 8C. In this example, three depth planes 810 are shown with intermediate planes being provided at 811. In this instance, if one of the candidate depths is the depth plane 810A, it would be typical to also include candidate depths corresponding to the depth planes 811A, 811B as shown. It will be appreciated that the adjacent depth planes 811 are usually intermediate to depth planes 810 defined at the previous lower resolution, due to the presence of an increased number of depth planes at the current resolution.

At step 635 the microprocessor 300 calculates a consistency score for each candidate depth. The consistency score can be determined in any suitable manner and in one example this is performed using a parallax local method, constrained to the candidate depths determined at step 630. This reduces the computational requirements associated with this process (compared to if a greater number of depths are used), as well as constraining the depths over which matching is performed, thereby allowing this to be performed rapidly, whilst reducing the likelihood of incorrect depth estimation.

An example consistency score is shown at 820 in FIG. 8C. As shown the consistency score differs for different depth planes and this represents the photo-consistency associated with the current pixel being provided at that respective depth. Thus, this process examines the similarity of candidate pixels in other ones of the images taken from afferent or different viewpoints and uses this to assess the most likely depth of the current pixel. In the current example, the most likely depth is indicated by the minimum consistency score 821. However, this will depend on the nature of the consistency score, and the manner in which it is calculated. Accordingly, as an alternative the most likely depth may be indicated by a maximal score.

In any event, at step 640 a depth with an optimum (maximal or minimal) consistency score is determined by the microprocessor 300. In one example, this involves simply selecting the candidate depth having the lowest consistency score. It will be appreciated however, that the optimum consistency score may be not coincide with the defined depth planes, and accordingly, the consistency score between depth planes can be interpolated, for example using a quadratic interpolation, to estimate the depth at which a lowest consistency score occurs. The microprocessor 300 uses the depth with the optimum consistency score is then used to update the depth estimate data of the current pixel at step 645.

At step 650 it is determined if the refinement process has been completed for all current pixels in the current resolution of the image. If not, the process returns to step 620 with a next current pixel being selected.

Once all the current pixels in the current resolution of the image have had their depth estimate refined during a first pass, subsequent passes may be performed. This is done to further refine the depth estimates obtained for the current pixels in the current image resolution. Thus, it will be appreciated as the current pixel depth estimates are refined, this can be used to update the candidate depths over which the local method is performed, allowing this to be repeated in multiple passes, with the depth estimates being further refined in each pass. Typically, this process will be performed a set number of times, depending on the level of accuracy required, and accordingly, at step 655 the microprocessor 300 determines if all iterations are complete and if not the process returns to step 620 to allow a next current pixel to be selected for further refinement.

Figure 7B:
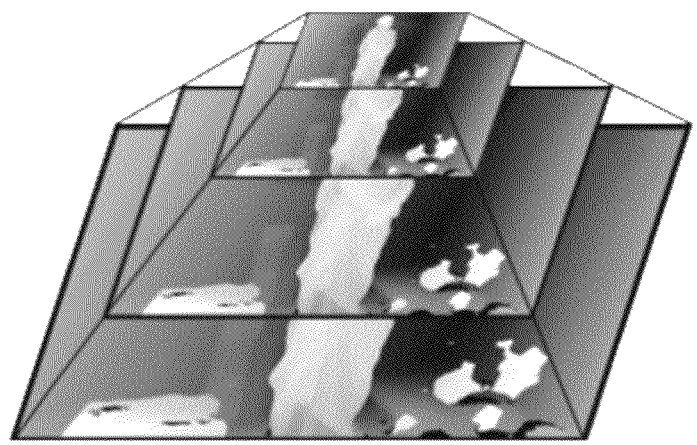

If it is determined that all iterations for the current resolution image have been completed, at step 660 the microprocessor 300 determines if all image resolutions in the image hierarchy have been considered. If not, the process returns to step 610 to allow a next current resolution of the image to be selected. Thus, the microprocessor 300 will generate a depth map at each level in the image hierarchy, with the depth estimates determined in a previous level of the hierarchy being used to seed the depth estimates for the next level in the hierarchy, as shown in FIG. 7B.

Figure 9A:
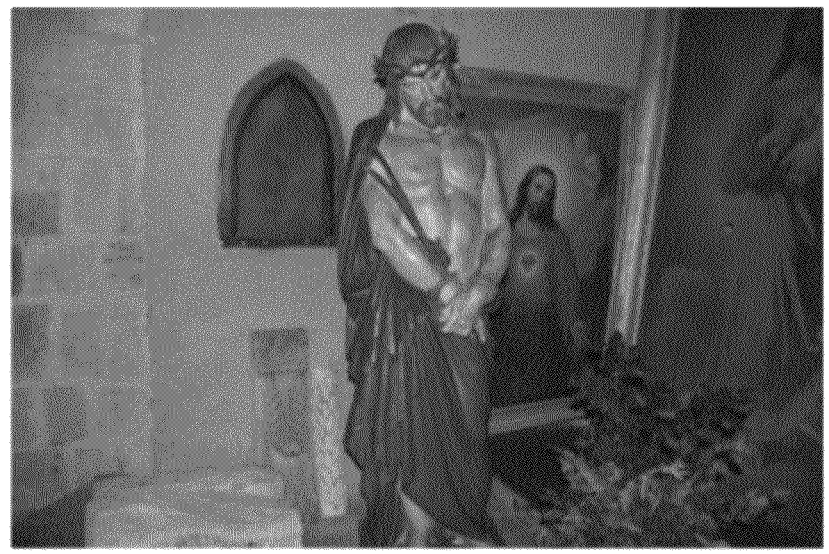
FIGS. 9A and 9B are examples of an image and corresponding resulting depth map.
Figure 9B:

Once all images in the hierarchy have been completed, the process ends at step 655 with the generation of a depth map for the highest resolution image, as shown in FIGS. 9A and 9B.

Accordingly, it will be appreciated that the above described technique allows pixel depths to be calculated rapidly, whilst ensuring a high degree of accuracy in the calculation.

A specific example of the process for determining pixel depth estimates will now be described with reference to FIGS. 10A and 10B.

As described above, the process includes refining the depth associated with a reference image by comparing and estimating the depths from a set of comparison images given the parallax relationship between the set is understood. This example employs a known method for determining the likelihood of a pixel having a particular depth.

Considering that a pixel location [row, column] can be made to correspond with a 2D homogeneous location q=[row, column, 1]. Assuming the reference image has a camera location specified by the matrix P that projects a 3D homogeneous point X into its 2D homogeneous location in the image x (i.e. x=PX). With the camera centered at the location C where PC=[0, 0, 0]. Furthermore, assuming that projection matrix can be partitioned as P=[M|m].

The 2D homogeneous location y in a comparison image (with a camera location specified by the matrix Q=[N|n]) corresponding with a depth d_i from the reference image at pixel location x can be calculated according to:

$$y = d\_i * N * Mi * x + N * C$$

where: Mi is the inverse of the matrix component M.

The above relationship allows for a direct comparison between pixels in a set of images under the assumption of their corresponding location in the scene being at a depth d_i.

Herein the term "similarity" is used to described how likely it is that a pixel x in the reference image has a depth d_i in the scene. The degree of similarity is governed by the application of a photo-consistency test applied to the candidate pixel x and its immediate neighbors.

The number of neighboring pixels of x used in the similarity test is set as a parameter of the algorithm Nw. A value of Nw specifies the half-width of the window of pixels selected surrounding x. For example a value of Nw=1 would result in [1+2]*[1+2]=9 pixels being considered in this window. Typically higher values of Nw used in a similarity test result in a measure that is less effected by regions of the image that are lacking in texture, whereas lower values tend to provide better estimates in areas of high texture. Furthermore, higher values of Nw result in a greatly increased computational burden.

The type of similarity measure applied to the window of pixels surrounding x is derived from a measure that is known in the literature. Normalized Cross Correlation (NCC) attempts to reduce the effect of changes in lighting observed when viewing the same point in a scene from different camera locations.

Note that the similarity measure is applied in a pair-wise fashion and summed for each possible pair of comparison image (with pixels y) with the reference-image (with pixels x). A threshold is applied to any given similarity score whereby if any of the individual pairings of reference image and comparison image fails to be similar enough the that depth value estimate is considered as being incorrect and subsequently cannot be accepted as an updated estimate.

The alterations to the standard NCC measure have been made in this instance to make the resulting similarity score more robust to scene object boundaries. The observation is that object boundaries in the scene tend to occur simultaneously in the image with a change in the color or the pixels or texture of the region surrounding a pixel. To account for this, the version of the NCC used within the process only considers pixels within the window surrounding the pixel x that have a RGB color that is close to its own. Pixels that are not close in color do not contribute to the sets of pixels that are use to evaluate the NCC score.

The assessments of color difference are made solely on the pixels from the reference image of the multi-image set and the relevant threshold has been set empirically. Using this approach the incidence of spurious similarity measures and consequently spurious depth estimates are reduced.

Alternative examples include those that employ other methods to derive the similarity measure for the purpose of assessing depth for a pixel.

This process of estimating and refining the depth for the reference image proceeds hierarchically through the "image-pyramid" shown in FIG. 7A. The image pyramid refers to the successive changes in resolution of the reference image, which in one example includes a change in resolution by a factor of two between successive images.

The first stage in the hierarchical depth estimation process is determining a suitable initial depth-map for the lowest resolution version of the reference image. As the lowest resolution of the reference image is many times small than the highest resolution, the depth-map corresponding at this resolution can be calculated very rapidly.

In this example, a global method is used to calculate the depth map at the reference level of the image pyramid. Note that any method capable of calculating a depth map using parallax been in a set of images could use this global approach. However the global method has the aforementioned advantages of accuracy with disadvantages of speed and memory utilization. These disadvantages are mitigated by calculating the depth-map for the reference image over a limited number of depth levels and a significantly lower resolution of the reference image.

Figure 10A:
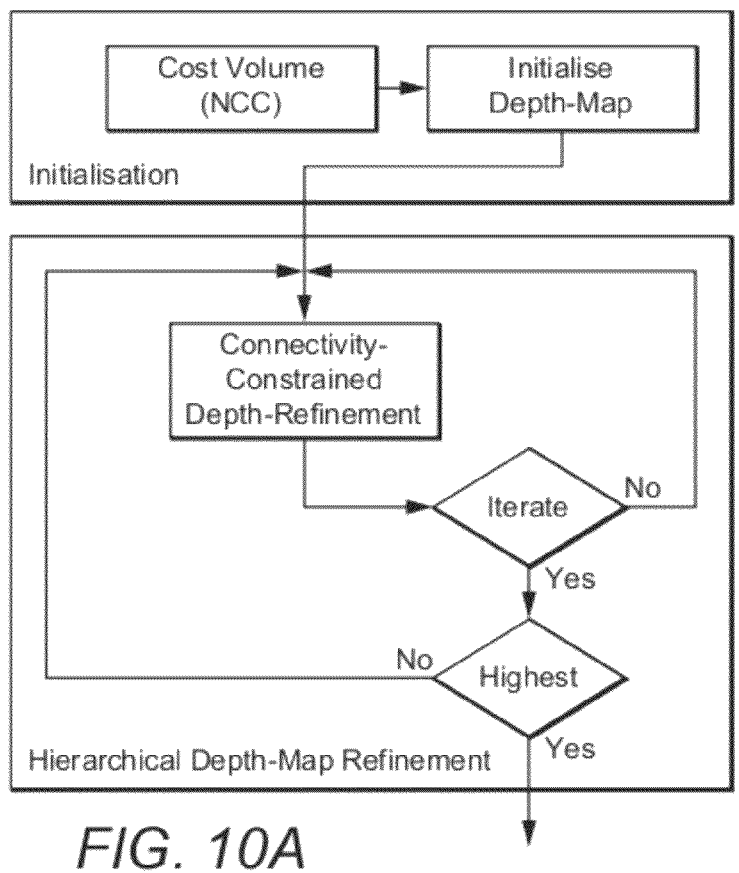
FIG. 10A is a flowchart of a third example of a method for determining a depth estimate for a pixel in a reference image.
Figure 10B:
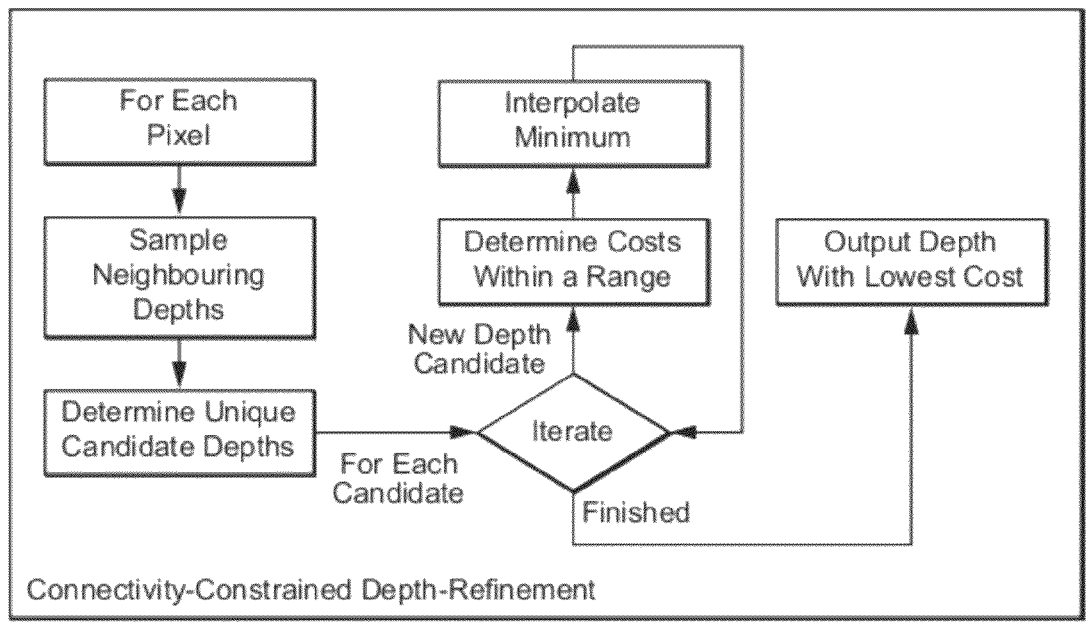
FIG. 10B is a flowchart of an example of the connectivity constrained depth refinement process of FIG. 10A.

The initial depth map determined during the initialization process of FIG. 10A is then used as seed values for determining the depth maps for images of increasing pixel and depth resolution. The global method used to initialize the reference image depth map has also ensured that a suitable low rate of bad or incorrectly classified depths have been associated with pixels. This can help to reduce incorrect estimates being propagated higher into the image pyramid and for subsequent refinements.

The example now proceeds hierarchically by considering a depth estimate from a previous resolution of the image and then refining the depth estimates using the depth map refinement process of FIG. 10A. The depth map refinement process includes a connectivity constrained depth refinement, which is performed on each current pixel within the current resolution of the image. This process, shown in more detail in FIG. 10B, involves, on a per pixel (i.e. local) basis—searching nearby depth planes for a depth value with an improved photo-consistency score. The candidate depth planes selected for refinement are determined within a range of the depth estimate for the current pixel and neighboring pixels.

The location of pixels providing the candidate depth locations are typically selected according to a predetermined pattern, as described above with respect to FIG. 8A. It will be appreciated that other combinations of surrounding pixels could be considered, and that the examples shown are for the purpose of illustration only.

For a surrounding pixel's depth value to be considered for refinement it must be considerably different to other depth values already being considered for refinement. This is determined by testing that the difference to other pixels under consideration is greater than a set distance to other candidate depth values (determined as a small percentage of the total depth range). If more than one of the surrounding pixels have the same or very similar depth values then their ranges are considered is duplicate and consequently not searched more than once. Eliminating duplicate depths aids in speeding up the overall execution of the algorithm.

The candidate depth planes (d_c) selected from the surrounding pixels are now used as reference positions to search about for a new depth value for the pixel under consideration. Each depth candidate is used as the center of a search range specified according to:

$$d\_range\_min = d\_c - d\_levels * d\_inc$$

$$d\_range\_max = d\_c + d\_levels * d\_inc$$

$$d\_i = d\_range\_min + i * d\_inc$$

This range could be continuous with a bisection or parabolic type approach as an alternative embodiment.

In this example, d_inc can be set at each iteration of the refinement process to govern the step size surrounding a depth candidate to be considered for each depth new depth candidate test. Greater values of the d_inc will allow the algorithm to potential move faster to a solution at the risk of over shooting its true depth value. Smaller values ensure that search proceeds more cautiously, increasing the chance that a local minimum for the pixel's depth is found.

d_levels specifies the number of increments on either side of a depth candidate searched for a new depth value. Similar to the arguments presented for the setting of the d_inc parameter greater values of d_levels can increase the search range at the expense of a greatly increased number of search locations and consequently execution time.

d_i should be considered as the current depth location under consideration for each depth evaluation of a pixel, which in turn can be enumerated and indexed by the parameter i.

The value of d_inc should be gradually diminished as the hierarchical refinement process advances through the increasing resolutions of the reference image in the image pyramid. This allows the refinement process to slowly converge upon the local minimum for the similarity measure associated with the depth range for each pixel.

The above process is repeated on each level hierarchically for a set number of iterations. The higher the number of iterations on each level and the greater the value of d_levels the more effective the process becomes at improving depth estimates but at an increased computational cost.

Accordingly, this process is carried out for each pixel at each hierarchical level of the depth-refinement process. The pattern of pixels is sampled surrounding the current pixel to record their current depth estimates from the previous iteration. This pattern can be alternated at subsequent iterations to avoid the same combinations of depths being trailed at new iterations.

The set of surrounding depths is then analyzed to remove duplicate depth values. The removal of duplicates ensures that the same depth candidate is not trailed twice, thereby improving execution times, and resulting in a unique set of depth candidates to be tested.

For each unique depth candidate a photo-consistency cost is determined for depth values including and surrounding the current candidate depth value. The selection of the surrounding depth values trailed is chosen according to the hierarchical level being assessed.

If a minimum cost value is found amongst the trailed depths, a more accurate value for its true depth is obtained by quadratically interpolating from the surrounding depth values. This interpolated value and its interpolated cost is then stored in preference to the original values. Upon completion of the testing, the depth value for the pixel with the minimum cost is returned as the new estimate for this iteration.

Persons skilled in the art will appreciate that numerous variations and modifications will become apparent. All such variations and modifications which become apparent to persons skilled in the art should be considered to fall within the spirit and scope of the invention broadly appearing and described in more detail herein.

The term pixel (or picture element) is generally understood to include a single point in an image or the smallest addressable screen element on a display. However, it will be understood in the context of the current application that the term pixel can refer to any defined element or region within an image and could include a single smallest picture element in the current resolution of the image, or a group of picture elements.

Additional Considerations

The previous discussion focuses on techniques for creating one or more current depth estimates for one or more pixels in an image. The following discussion elaborates on contemplated application of a current depth estimates.

One should appreciate that contemplated processing systems (e.g., processing system 201 of FIG. 2) can take on many different forms. In some embodiments, the processing system comprises a depth analysis engine or device configured to operate as discussed above. Access can be provided to the depth analysis engine or device through various techniques. For example, the depth analysis engine can be disposed within a mobile device or cell phone; possibly as a module, chip(s), application, library, or other technique (see end stations 203 of FIG. 2). Further, the depth analysis engine could include a remote server or service and can be accessed over a network, once any suitable authentication or authorization has taken place if required (e.g., user password, certificates, cookies, Kerberos, RADIUS, key exchange etc.). Still further, the roles or responsibilities of the depth analysis engine can be distributed among multiple devices or within virtual machines functioning locally to a device, within a device, or as a remote cloud-based service. Contemplated devices capable of being configured to operate as a depth analysis engine or device can include cell phones, vehicles (e.g., spacecraft, airplanes, cars, trucks, trains, etc.), cameras, game controllers, game consoles or set-top-boxes, interactive kiosk, televisions, server computers, personal computers, point-of-sales devices, or other devices capable of supporting one or more processors and memory.

In some embodiments, the disclosed techniques can be combined with one or more other image analysis techniques. For example, an image can be analyzed to extract one or more features derived from Scale-Invariant Feature Transform (SIFT; Lowe, David G. (1999). "Object recognition from local scale-invariant features". Proceedings of the International Conference on Computer Vision. 2. pp. 1150-1157; U.S. Pat. No. 6,711,293 to Lowe titled "Method and Apparatus for Identifying Scale Invariant Features in an Image and Use of Same for Locating an Object in an Image", filed Mar. 6, 2000). SIFT descriptors can be used to select which regions of an image might be of most interest when conducting current depth estimate analysis. Alternatively, based on a current depth estimate analysis, regions of an image can be selected for SIFT analysis and generation of descriptors. Such a hybrid approach provides for isolation of relevant objects in an image (e.g., foreground objects, background objects, etc.) and then quickly generating an object feature signature for the corresponding object, which can then be used for object recognition as suggested by U.S. Pat. Nos. 7,016,532; 7,477,780; 7,680,324; 7,403,652; 7,565,008; 7,899,243; 7,881,529; 7,899,252; 7,775,437; and 7,564,469. For example, SIFT descriptors and depth estimates associated with an object, or even just the depth estimates, can be used as an index into an object database to retrieve additional information about imaged objects. The information within the database can be indexed based on the depth estimates or descriptors. Alternatively the information index can be derived through a mapping function or table that translates the depth estimates or descriptors to an indexing scheme for the database.

Leveraging current depth estimates offers many advantages. Current depth estimates from an image, or a plurality of related images (e.g., video, etc.), can be used to construct one or more depth estimate signatures for the image itself or objects within the image. Depth estimate signature can be derived by collecting depth values for regions in the image, possibly into a vector, an Ntuple, or other multi-valued structures. The signature can then be used to trigger one or more actions to be taken by a computing device; a cell phone imaging an object for example, by comparing the signature's values to the triggering criteria requirements or optional conditions. Further, each known object can have a depth estimate signature, which can be stored in a database of known objects. When an image is analyzed, depth estimate signatures derived from the image can then be submitted to the database or other search engine as a query to retrieve object information or to initiate an action.

One should appreciate that a depth analysis signature for an object can include a normalized depth analysis signature where the normalized signature is independent of scale, distortion, occlusion, orientation, or position. The signature can be normalized by calculating depth estimates, then normalizing to relative positions, orientations, or values according to a described normalization function.

As intimated above, depth estimates can be combined with one or more object recognition descriptors to enhance recognition of multi-dimensional objects within a digital representation of scene (e.g., an image, a video, etc.). Previous approaches described in U.S. Pat. Nos. 6,711,293 and 7,477,780 leverage 2D descriptors (e.g., SIFT descriptors, Local Image Descriptors (LIDs), etc.) extracted from object images as a basis for object recognition, but fail to take into account an object's true shape, or time varying shape. The inventive subject matter is considered to include recognizing multi-dimensional objects, especially three dimensional objects, as a function of depth estimates and descriptors.

Applying depth estimates along with descriptors aids in resolving possible issues that can arise using descriptors alone. First, the image can have affine or perspective distortion which can vary according to the viewpoint from which the image was taken. Such affine/perspective distortion can make identification of relevant descriptors difficult. Further, the distortion can change with time when motion imagery is involved. Second, objects in images can suffer from occlusion where the object itself or other elements within the scene can occlude portions of the object, thus obscuring descriptors. Depth estimates combined with descriptors mitigates issues arising from distortion or occlusion through providing an understanding of an objects actual undistorted shape.

One aspect of the inventive subject matter includes construction of 3D descriptors, which takes into account a shape of an object as well as the objects features that give rise to traditional descriptors. An object recognition engine (e.g., processing system 201 of FIG. 2) can comprise a database of 3D descriptors of known objects created possibly through an offline training or learning phase. It is also contemplated that the database can be populated in real-time from user submitted digital representations of objects. During actual use, the object recognition engine can analyze digital representations to derive one or more 3D descriptors, which can then be used to search for objects in the database having similar 3D descriptors; adjusted for distortion or occlusion. One should appreciate the disclosed recognition engine, object database, or rendering engine (see processing system 201 and other elements of FIG. 2) can be distributed among elements in a processing ecosystem. For example, the recognition engine can be disposed within a cell phone, a camera, or a distal server or service. Further, the object database can be disposed in the same devices or on a remote server, or even on a search engine (e.g., Yahoo!®, Google®, Bing®, etc.)

Contemplated training or learning phases can be conducted through numerous techniques. One technique includes capturing digital representations (e.g., images, video, etc.) via a 3D scanning device of an object where the digital representation comprises at least a 3D view providing a shape of the object. In some embodiments, the disclosed depth estimation techniques can be used to reconstruct a 3D model of the object. Further, the digital representations can include multiple images from different views or perspectives of the object or could include motion imagery of the object. Some embodiments utilize a 3D scanning system, including a camera or other optical sensor, to capture the digital representation of an object of interest. In other embodiments, the digital representation can be obtained through submission by remote users, ambient sensors, security systems, or other sensor systems that capture information about the objects. For example, digital representations from more than one device can be aggregated together to build a 3D model of an object. Perhaps images of a social function obtained from user Facebook profiles and security cameras can be used to create 3D models of the environment or objects within the social function. Facebook tags can be used identify the objects or people within the modeled environment.

A next step can include extracting one or more descriptors (e.g., SIFT descriptors, color descriptors, texture descriptors, shape descriptors, motion descriptors, location descriptors, domain specific descriptors, LIDs, etc.) associated with the digital representation of the object. For example, the techniques disclosed in U.S. Pat. Nos. 6,711,293 and 7,477,780 leverage 2D descriptors and represent acceptable techniques for deriving descriptors.

The learning phase can further include normalizing 3D locations of the descriptors as a function of the depth estimates. The normalized 3D locations can be associated with the descriptors and their associated surface normal (e.g., vector orthogonal to the surface at the descriptor location). A combined 3D location and a descriptor forms a 3D descriptor. An astute reader will recognize this step as constructing a depth estimate signature comprising normalized values or features.

Optionally, as alluded to previously, the shape of an object represented by one or more 3D locations relative to each other can be used to select one or more descriptors of relevance. The relevance of the descriptors can be determined by suitable shape characteristics possibly including measures of curvature, flatness, texture, or other depth-based property. In more preferred embodiments, descriptors are selected based on suitable flat locations of the object or locations lacking substantial curvature. Selection of relevant descriptors aids in reducing storage size of 3D descriptors or provides for reduced computation.

As 3D descriptors are built or otherwise created, they can be recorded by the recognition system into a descriptor database where the descriptors of known objects are located. Aggregated 3D descriptors for a single object can be stored as a global or 3D shape reconstruction of the object or synthetic model of the object. The representation or model can be stored in the form of a mesh or in a voxel-based format. One should appreciate that the model does not necessarily represent a model understandable by humans, but rather represents a machine-understandable model. The mesh can be stored at any desired resolution according to the capabilities of a 3D scanning device, or at reduced or decimated resolution for transmission.

Contemplated recognition phases include a recognition engine extracting one or more descriptors from a captured image. The descriptors can be used to identify one or more objects in the image if desired as an initial pass. Further, the image can be analyzed to generate depth estimates relative to the camera position. The depth estimates are used to generate one or more 3D locations for the extracted descriptors. Distortion in the image is resolved based on the normalized 3D descriptors stored during the learning phase by mapping the known 3D descriptors to the affine/perspective distortion associated with the extract descriptors.

The recognition engine can further include a rendering engine which uses the 3D model of the object to determine which descriptors would be visible from the current position or orientation of the camera relative to the object of interest. For example, the rendering engine can construct a model and apply ray-tracing to determine where an AR object should be placed. Knowledge gained from the learning phase also providing insight in to how different lighting sources affect different locations of the object based on the 3D model. Such knowledge mitigates possible issues associated with an environment's lighting conditions.

One should appreciate that additional sensor or ambient information can be used to further restrict a search for recognized objects. Example additional sensor data can include accelerometer data, compass data, inertial measurement unit data, GPS coordinates, time stamps, geo-fence information, or other types of data.

Using depth estimates coupled with descriptors gives rise to many advantageous uses. Creation and management of object 3D descriptors enables true 3D object recognition or tracking in a digital representation of a 3D environment.

Within Augmented Reality (AR) environments, one or more 3D real-world objects can be recognized or tracked in a scene. AR content can be integrated with the real-world objects where the AR content is presented in a display as an overlay of images on the real-world objects. The AR content can be adjusted to conform to the shapes of the real-world objects, be occluded by the real-world objects, or even occludes the real-world objects in the display according to the 3D descriptors. For example, a user might image a real-world building as part of an AR game. A game object can be superimposed on the image with the real-world building where the game object is rendered as being behind the building and can only be partially observed.

Another aspect of the inventive subject includes using 3D descriptors or depth estimates in manufacture of objects or products. Objects can be manufacture to have specific or normalized depth signatures comprising 3D descriptors that are specifically configured to enhance generating enhanced current depth estimates according to the disclosed techniques. For example, a specific brand of soda might create a soda can having a specific contour or shape according to a desired depth estimate signature or 3D descriptors. When the can is imaged and analyzed, the resulting depth estimate signatures of the can would be sufficiently similar, to within acceptable thresholds, of the desired depth estimate signature. The inventive subject matter is considered to include constructing a good or product according to a desired depth estimate signature and associated 3D descriptors that enhances a calculated depth estimate signature. One should appreciate that such an approach is not limited to the disclosed depth estimate determination techniques but can be applied to multiple depth estimate techniques including parallax, local methods, global methods, or other techniques known or yet to be invented. Further, creating a desired depth estimate signature is not limited to a product. In addition a scene or other real-world objects can be constructed or arranged to have a desired depth estimate signature. Such approaches can be used in building construction, street or city planning, interior decorating, 3D movie filming, or other types of structures that can compose a scene. As an example, consider satellite imagery of a scene. The current depth estimates can be derived based on satellite imagery in order to detect or recognize buildings or other scenes from space.

The above disclosed techniques contemplate calculating a current depth estimate based on imaged objects resulting from the visible spectrum. One should further appreciate that the image data can include data representing of scene based on non-visible data (e.g., infrared, x-ray, ultrasound, radar, etc.). Thus, the current depth estimates, or even 3D descriptors, can vary based on the modality of the data or the spectrum used to image a scene. For example, ultrasound imaging or MRI imaging systems can leverage the depth estimate techniques for medical imaging or for object recognition.

Current depth estimates or 3D descriptors associated with image data can be used to trigger one or more actions on a computing device, possibly even the device that captured the image data. The computing device can be configured to initiate an action based on information obtained from the depth analysis engine or recognition engine. As discussed previously, the depth analysis engine could be local or within the computing device, or distal to the computing device. In some embodiments, the action can be initiated based on action triggering criteria within the device. The triggering criteria can include one or more rules comprising requirements or optional conditions that are to be satisfied as a function of one or more current depth estimates, 3D descriptors, or estimate signatures in order to initiate the corresponding action. Other embodiments can trigger actions based on instructions received from the depth analysis engine or other entity as a result of deriving current depth estimates or 3D descriptors. For example, a recognition engine could use the current depth estimates or 3D descriptors from the depth analysis engine as a query to obtain one or more device instructions from an instruction database. The instructions can then be transmitted to the computing device for execution. The criteria, local or remote, for triggering an action can also depending other dimensions of relevance beyond a current depth estimate, possibly including location (e.g., GPS, triangulation, recognized features of a scene, etc.), a time or date, a geo-fence definition, modality of data, biometrics, accelerometer data, compass or magnetometer data, captured audio data, or other types of data.

Regardless of how an action is initiated, the action initiated can cover a broad spectrum of capabilities. Contemplated actions include initiating or launching an application or software process on the computing device, changing or modifying an operating system behavior, loading or dismounting operating system modules, participating in a transaction with an account, conducting a communication, playing a media file (e.g., audio, video, kinesthetic, etc.), presenting images or overlays on a display, track one or more objects in motion imagery, scheduling an appointment, or other types of actions. In some embodiments, that action can include construction or instantiation of a virtual machine within the computing device.

With respect to instantiating a virtual machine, consider the following example use-case. A tourist in New York City could image Times Square with their smart phone or tablet (e.g., iPhone®, iPad®, Android® based phone, Samsung 10.1 tablet, etc.) and the resulting image or images can be analyzed to derive a current or normalized depth estimate signature for Times Square. The depth estimate signature of 3D descriptors can then be used to recognize features of Times Squares, possibly including locations or orientations of billboards relative to the user or imaging device. Further, the signature can be used to look up the parameters of a virtual machine to be instantiated within the cell phone. Once instantiated, the cell phone can obtain or play rich media content associated with the billboards, possibly overlaying the rich media content on the image of the billboard within the cell phone display. Such an approach is advantageous because the virtual machine can be instantiated to respect the digital rights of the owner of the rich media content. One should further appreciate that each billboard that triggers playback of rich media content could have drastically different requirements with respect to Digital Rights Management (DRM). Consequently, the cell phone can be instructed to instantiate individual virtual machines for each billboard where each virtual machine comprises distinct properties (e.g., bandwidth, rights, playback time, authorization, billing if required, memory requirements, number of threads, compute power, etc.) to play corresponding media. Thus, one aspect of the inventive subject matter is considered to include instantiating a virtual machine as a function of current or normalized depth estimates. Example techniques that can be suitably adapted for use with respect to instantiating virtual machines include those described in U.S. Pat. Nos. 7,181,617; and 7,685,417.

Consider another use case. A car, truck, or other vehicle can be configured with a depth analysis engine and one or more cameras. As the vehicle travels, the depth analysis engine can determine location of objects relative to the vehicle. Should one of the objects encroach too closely to the moving vehicle based on the current depth estimates, the vehicle's breaking system can be engaged. For example, the contemplated system could be integrated within a back-up camera system in a truck or car.

Yet another use case could include projection systems. A projection system with one or more cameras could image a textured or contoured surface (e.g., a building, statue, scene, etc.). Based on current depth estimates, the projection system can adjust, via software, a projected image on to the surface to adjust for irregularities in the surface in order to present a desired image.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for determining a depth estimate for at least one pixel in a reference image, the reference image being one of a plurality of images of a three dimensional scene, the method including:
    a) providing access to a depth analysis engine comprising a device interface;
    b) obtaining, by the depth analysis engine, a plurality of images including a reference image representative of a scene via the device interface, wherein each of the plurality of images comprises a different perspective of the scene;
    c) determining first depth estimates for first pixels in a first resolution of the reference image using a parallax method, the first resolution being a lowest resolution;
    d) determining, by the depth analysis engine, current depth estimates for current pixels in a current resolution of the reference image by using previous depth estimates for equivalent previous pixels in a previous resolution of the reference image, the previous resolution being lower than the current resolution; and
    e) deriving, by the depth analysis engine, a refined depth estimate by refining the current depth estimate for at least one current pixel via:
        i) determining a plurality of candidate depths at least in part using the current depth estimates of the neighboring pixels and not that of the current pixel;
        ii) determining consistency scores for at least some of the candidate depths, the consistency score being indicative of the similarity of the current pixel with at least one candidate pixel in a first image and a second, different image from the plurality of images;
        iii) updating the current depth estimate of the current pixel using the consistency scores; and
    f) configuring a device to initiate an action as a function of the refined current depth estimate.

2. A method according to claim 1, wherein the method includes, refining the current depth estimate by:
    a) selecting a candidate depth having an optimum consistency score; and
    b) refining the current depth estimate using the selected candidate depth.

3. A method according to claim 2, wherein the method includes, refining the current depth estimate by replacing the current depth estimate with:
    a) the selected candidate depth; and
    b) a depth interpolated from the selected candidate depth and two or more neighboring candidate depths using the respective consistency scores.

4. A method according to claim 1, wherein the method includes, determining the plurality of candidate depths by:
    a) comparing the current pixel to a plurality of neighboring current pixels;
    b) selecting at least one neighboring current pixel referenced on a similarity to the current pixel; and
    c) determining the candidate depths to include the current depth estimates of the current pixel and the at least one selected neighboring current pixel.

5. A method according to claim 4, wherein the method includes, determining the plurality of candidate depths to include the current depth estimates and adjacent depth estimates of the current pixel and the at least one selected neighboring current pixel.

6. A method according to claim 1, wherein the previous and current depth estimates are assigned to previous and current depth planes respectively, said previous and current depth planes defining a number of previous depth planes and a number of current depth planes wherein the number of current depth planes being greater than the number of previous depth planes.

7. A method according to claim 1, wherein the candidate depths are at least one of:
    a) a plurality of discrete depths; and
    b) a depth range.

8. A method according to claim 1, wherein the method includes iteratively refining the current depth estimates of current pixels in the current resolution of the reference image.

9. A method according to claim 8, wherein the method includes iteratively refining the current depth estimates by:
    a) refining the current depth estimate of a plurality of current pixels; and
    b) further refining the current depth estimate of at least one of the plurality of current pixels.

10. A method according to claim 1, wherein a current pixel is equivalent to a previous pixel if the current and previous pixels are at the same location in the reference image.

11. A method according to claim 1, wherein the method includes, determining the first depth estimates using a global parallax method.

12. A method according to claim 1, wherein the method includes, refining the current depth estimates for current resolutions of the image using a parallax local method, wherein the local method is performed for limited candidate depths determined from previous depth estimates of equivalent previous pixels from a previous lower resolution of the reference image.

13. A method according to claim 1, wherein the method includes:
    a) in an electronic processing device operating as the depth analysis engine, determining the current depth estimates; and
    b) in the electronic processing device operating as the depth analysis engine, refining the current depth estimate for at least one current pixel by:
        i) selecting the plurality of candidate depths;
        ii) calculating the consistency scores; and
        iii) updating the current depth estimate of the current pixel.

14. A method according to claim 13, wherein the method includes, storing in a store, at least one of:
    a) image data; and
    b) depth estimate data.

15. A method according to claim 14, wherein the method includes updating a current depth estimate by updating depth estimate data stored in a store.

16. The method of claim 1, wherein the at least one candidate pixel in the first image and the second image each corresponds to a neighboring current pixel from the at least one current pixel associated with a candidate depth from the at least some of the candidate depths.

17. A method for determining a depth estimate for at least one pixel in a reference image, the reference image being one of a plurality of images of a three dimensional scene, the method including:
   a) providing access to a depth analysis engine comprising a device interface;
   b) obtaining, by the depth analysis engine, a plurality of images including a reference image representative of a scene via the device interface, wherein each of the plurality of images comprises a different perspective of the scene;
   c) determining, by the depth analysis engine, current depth estimates for current pixels in a current resolution of the reference image by successively increasing current resolutions of the reference image using previous depth estimates of equivalent previous pixels from a previous lower resolution of the reference image; and
   d) deriving, by the depth analysis engine, a refined depth estimate by refining the current depth estimate for at least one current pixel via:
      i) determining a plurality of candidate depths at least in part using the current depth estimates of the neighboring pixels and not that of the current pixel;
      ii) determining consistency scores for at least some of the candidate depths, the consistency score being indicative of the similarity of the current pixel with at least one candidate pixel in a first image and a second, different image from the plurality of images;
      iii) updating the current depth estimate of the current pixel using the consistency scores; and
   e) configuring a device to initiate an action as a function of the refined current depth estimate.

18. A method according to claim 17, wherein the method includes, refining the current depth estimate by:
   a) selecting a candidate depth having an optimum consistency score; and
   b) refining the current depth estimate using the selected candidate depth.

19. A method according to claim 18, wherein the method includes, refining the current depth estimate by replacing the current depth estimate with:
   a) the selected candidate depth; and
   b) a depth interpolated from the selected candidate depth and two or more neighboring candidate depths using the respective consistency scores.

20. A method according to claim 17, wherein the method includes, determining the plurality of candidate depths by:
   a) comparing the current pixel to a plurality of neighboring current pixels;
   b) selecting at least one neighboring current pixel referenced on a similarity to the current pixel; and
   c) determining the candidate depths to include the current depth estimates of the current pixel and the at least one selected neighboring current pixel.

21. A method according to claim 20, wherein the method includes, determining the plurality of candidate depths to include the current depth estimates and adjacent depth estimates of the current pixel and the at least one selected neighboring current pixel.

22. A method according to claim 17, wherein the previous and current depth estimates are assigned to previous and current depth planes respectively, said previous and current depth planes defining a number of previous depth planes and a number of current depth planes wherein the number of current depth planes being greater than the number of previous depth planes.

23. A method according to claim 17, wherein the candidate depths are at least one of:
   a) a plurality of discrete depths; and
   b) a depth range.

24. A method according to claim 17, wherein the method includes iteratively refining the current depth estimates of current pixels in the current resolution of the reference image.

25. A method according to claim 24, wherein the method includes iteratively refining the current depth estimates by:
   a) refining the current depth estimate of a plurality of current pixels; and
   b) further refining the current depth estimate of at least one of the plurality of current pixels.

26. A method according to claim 17, wherein a current pixel is equivalent to a previous pixel if the current and previous pixels are at the same location in the reference image.

27. A method according to claim 17, wherein the method includes, refining the current depth estimates for current resolutions of the image using a parallax local method, wherein the local method is performed for limited candidate depths determined from previous depth estimates of equivalent previous pixels from a previous lower resolution of the reference image.

28. A method according to claim 17, wherein the method includes:
   a) in an electronic processing device operating as the depth analysis engine, determining the current depth estimates; and
   b) in the electronic processing device operating as the depth analysis engine, refining the current depth estimate for at least one current pixel by:
      i) selecting the plurality of candidate depths;
      ii) calculating the consistency scores; and
      iii) updating the current depth estimate of the current pixel.

29. A method according to claim 28, wherein the method includes, storing in a store, at least one of:
   a) image data; and
   b) depth estimate data.

30. A method according to claim 29, wherein the method includes updating a current depth estimate by updating depth estimate data stored in a store.

31. A method according to claim 17, wherein the at least one candidate pixel in the first image and the second image each corresponds to a neighboring current pixel from the at least one current pixel associated with a candidate depth from the at least some of the candidate depths.

* * * * *

UNITED STATES PATENT AND TRADEMARK OFFICE
CERTIFICATE OF CORRECTION

Page 1 of 1

PATENT NO. : 9,177,381 B2
APPLICATION NO. : 13/330883
DATED : November 3, 2015
INVENTOR(S) : David McKinnon It is certified that error appears in the above-identified patent and that said Letters Patent is hereby corrected as shown below:

On the Title Page, under (73) Assignee:

Please delete "Nani", and insert --Nant--.

Signed and Sealed this
Twenty-second Day of March, 2016

Michelle K. Lee
*Director of the United States Patent and Trademark Office*